(12) United States Patent
Fountain et al.

(10) Patent No.: US 7,316,189 B2
(45) Date of Patent: Jan. 8, 2008

(54) AUTOMATED PLANTER

(75) Inventors: Christopher George Fountain, Boston (GB); Nicholas Fountain, Boston (GB); Robin Charles Fountain, Boston (GB)

(73) Assignee: Ultracell Limited, Boston, Lincolnshire (GB)

( * ) Notice: Subject to any disclaimer, the term of this patent is extended or adjusted under 35 U.S.C. 154(b) by 73 days.

(21) Appl. No.: 10/566,337

(22) PCT Filed: Jul. 29, 2003

(86) PCT No.: PCT/GB03/03203

§ 371 (c)(1),
(2), (4) Date: Jan. 26, 2006

(87) PCT Pub. No.: WO2005/013670

PCT Pub. Date: Feb. 17, 2005

(65) Prior Publication Data

US 2006/0260522 A1  Nov. 23, 2006

(51) Int. Cl.
*A01C 11/00* (2006.01)

(52) U.S. Cl. .......... 111/105; 47/1.01 R; 47/901
(58) Field of Classification Search .......... 111/104, 111/105, 102, 900; 47/1.01 R, 901
See application file for complete search history.

(56) References Cited

U.S. PATENT DOCUMENTS 4,440,101 A  4/1984  Edwards et al.

FOREIGN PATENT DOCUMENTS

WO  03/000033 A1  1/2003

*Primary Examiner*—Christopher J. Novosad
(74) *Attorney, Agent, or Firm*—Richard M. Goldberg

(57) ABSTRACT

An automated planter includes a locating device arranged to locate a propagation tray; at least one plant extraction device adapted to pull a plant out of a propagation tray located by the locating device; and a delivery assembly arranged to receive a plant extracted by the at least one plant extraction device and deliver the received plant to the ground. The planter lifts the plants out of their cells in the tray by inserting fingers, which are caused to converge to pinch the root ball. A plant transport includes two tracks, such that one can be loaded while the other is transporting plants to the delivery assembly.

37 Claims, 11 Drawing Sheets

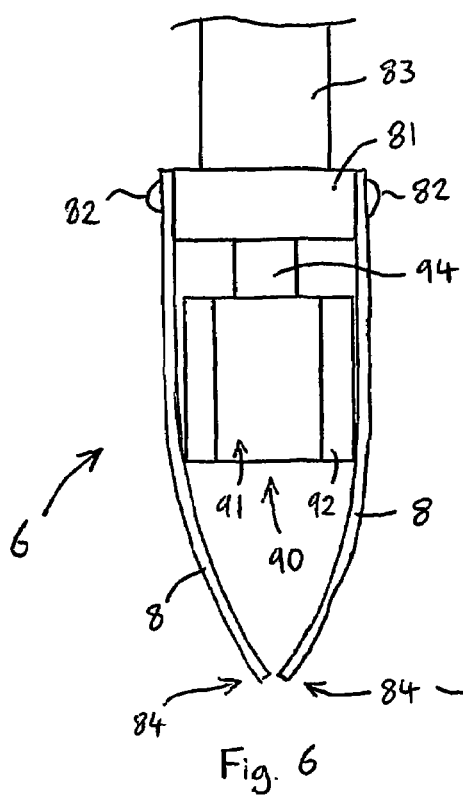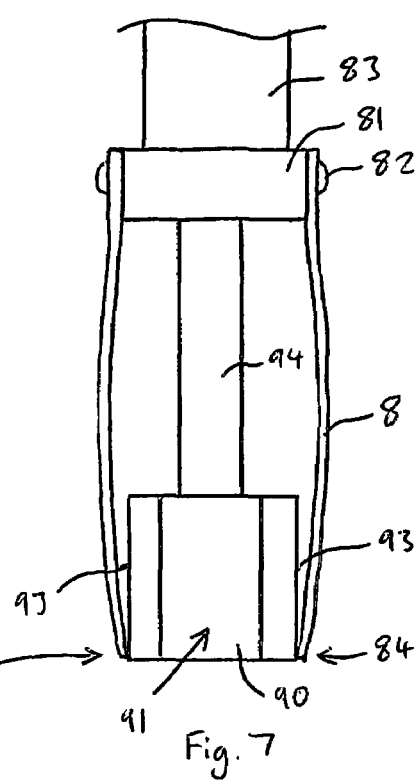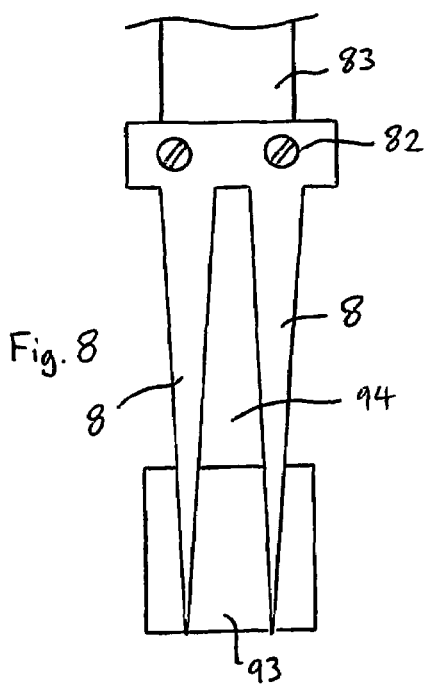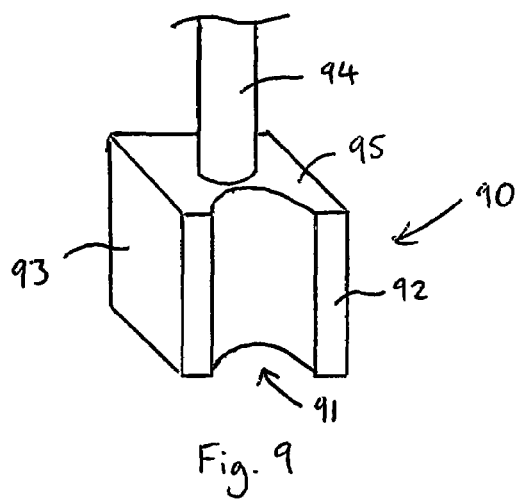

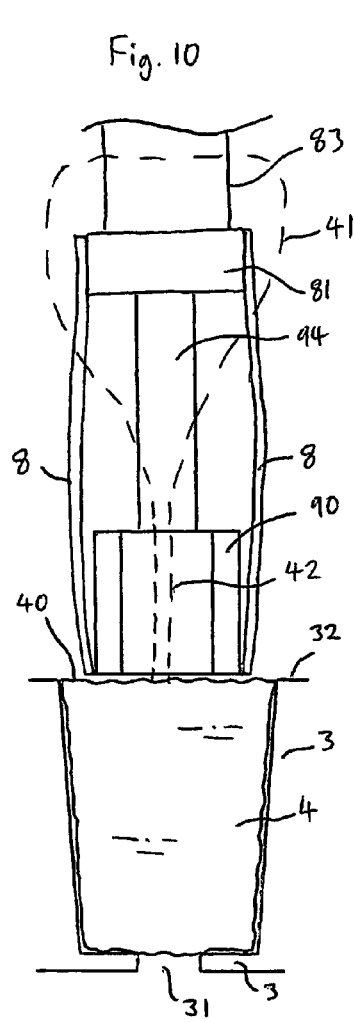
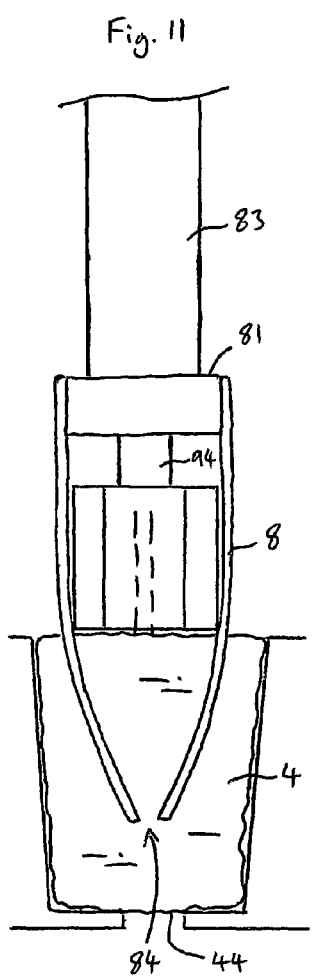
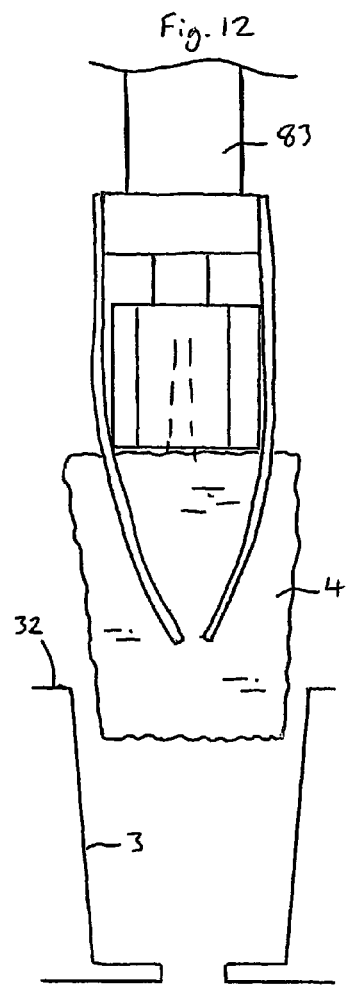
Fig. 10
Fig. 11
Fig. 12
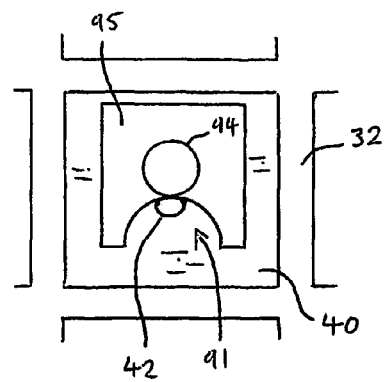
Fig. 13

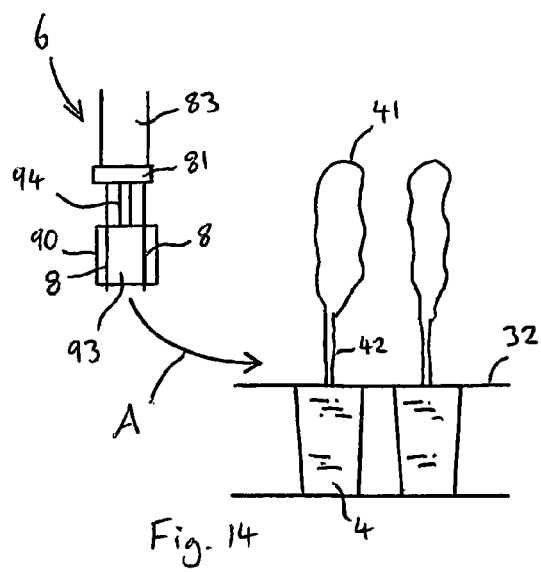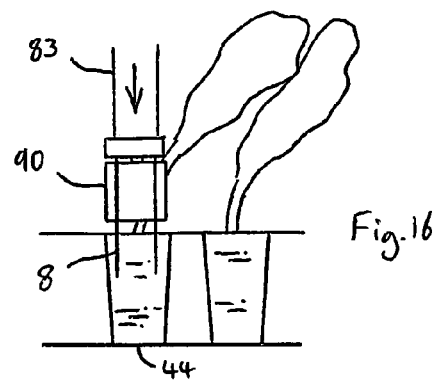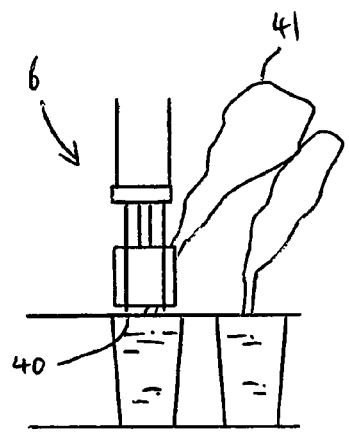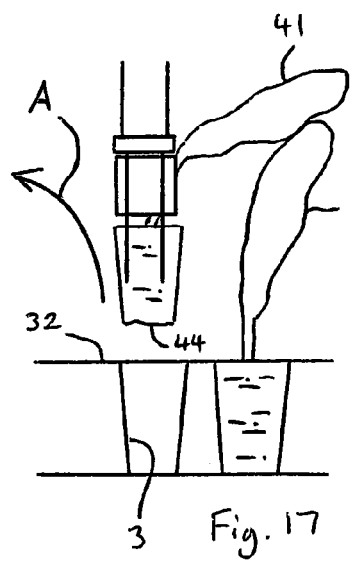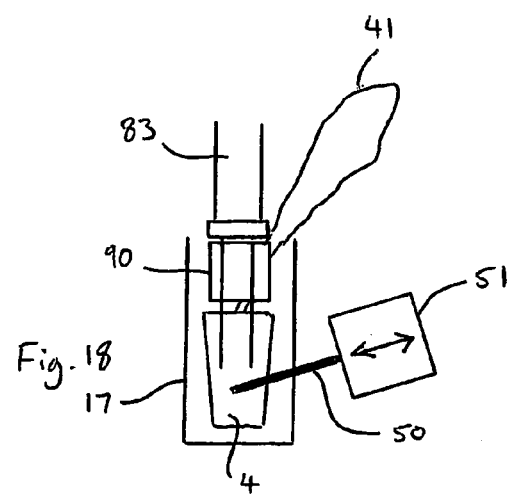

AUTOMATED PLANTER

FIELD OF THE INVENTION

This invention relates to the field of automated planting, and more specifically to the planting of plants from a propagation tray.

BACKGROUND OF THE INVENTION

Agricultural farming is a vital component of the food supply system in any country. In the past, such farming was extremely labour intensive. However, over the years technology has been applied to automate various tasks and thus improve the efficiency of the farming as a whole.

One area where machines have been particularly useful is in repetitive functions such as planting. In order for an individual plant (or crop) to enjoy optimum growing conditions, certain conditions must be met; one such condition is inter-plant spacing. Machines can be designed to provide constant spacing.

Although automation of many farming functions has taken place, there are still aspects where a human interaction is preferable (e.g. where the plant may be damaged). In a semi-automated system, the most likely point of a 'bottle neck' is with the human component.

Other disadvantages of involving humans include labour charges and limited work hours. With a machine, a minimal human workforce can successfully carry out the same work of much larger all-human workforce.

Certain plants, for example lettuces, leeks, the tobacco plant, and the Brassica plant (examples of which are cabbages and cauliflowers), are grown in propagation trays until they are a reasonable size. Once the plants are of a suitable size, they can be transferred into a field so that they grow to maturity. Each propagation tray comprises a grid of cells, with each cell housing an individual plant.

Traditionally the transfer of such plants to a field has involved the manual removal of each plant from the tray, and then feeding the plants into a planting machine. The need for human input means that this planting system suffers from the aforementioned problems. There is a need for a machine that is capable of carrying out the human elements of the planting process without damaging the crops being planted.

Ride-on, tractor-drawn planters are known, in which one or more people on the trailed unit manually remove plants from the propagation trays and then place the plants into a moving array of cups. The cups transport the plants to a chute, and they are dropped into the chute which then conveys the plants down to the ground. The speed at which the array of cups is moved thus, in part, determines the eventual spacing of the plants in the ground. However, in addition to requiring a large amount of labour, the use of drop chutes presents a further problem. The time taken for a plant to fall through the chutes will depend on a number of factors, including the weight of the root portion of the plant (which is very dependent on the moisture content) and the quantity and configuration of the foliage. These factors can vary from tray to tray, and indeed from cell to cell within a single tray, and so even if extracted plants are presented at a uniform rate to the top of the drop chute, the rate at which they emerge will vary and so leads to a variation in plant spacing.

Automated planters are known in which rows of plants are pushed out at a time by an array of pusher members (e.g. rods) from "below" the propagation tray (i.e. from the reverse side, the side opposite to that of the foliage). The pushed-out plants are conveyed by suitable means to drop chutes, through which they are conveyed to arrive at a planting shoe. From the shoe the plants are deposited in the ground. Again, the use of drop chute causes difficulties when trying to achieve even plant spacing. Also, blockages can occur. Subsequent handling of the plants, after they have been pushed out of the tray, poses yet further problems. Additionally, pushing the plants out from the trays can damage their roots, and variations in root-ball density and consistency can lead to different plants being pushed out to different extents. This can further complicate subsequent handling.

There is, therefore, a need for an automated planter that overcomes, at least partially, one or more of the problems associated with the prior art.

SUMMARY OF THE INVENTION

A first aspect of the present invention provides an automated planter comprising: locating means arranged to locate a propagation tray; plant extraction means adapted to pull a plant out of a propagation tray located by the locating means; and delivery means arranged to receive a plant extracted by the plant extraction means and deliver the received plant to the ground.

Preferably, the plant extraction means comprises at least one insertion member for insertion into a root portion of a plant in a located tray, through the upper surface of the root portion, to grip the root portion.

Preferably, the plant extraction means comprises at least two fingers for insertion into the root portion of a plant in a located tray (i.e. fingers may form the insertion members). It would be appreciated that the fingers may take a variety of forms such as pins, blades, prongs or tines.

Preferably, the plant extraction means comprises actuator means operable to cause the fingers to converge.

In certain preferred embodiments the fingers are sprung such that ends of the fingers are biased towards each other.

The fingers may be curved, for example formed from thin metal. In such cases, the natural resilience of the finger material may bias the free ends of the fingers towards each other, such that some means has to be provided to force those ends apart.

Preferably, the plant extraction means comprises four fingers, arranged in two pairs.

In certain preferred embodiments the plant extraction means further comprises a spacer member, located between the fingers, and slidable in one direction to push the finger ends apart, and in the opposite direction to allow the ends to converge.

The spacer member may be a block, with the fingers arranged at sides of the block, and the block may have a front edge, between the sides, which comprises a cut-out for engaging a stem of a plant.

The plant extraction means may be operable to slide the spacer member to the ends of the fingers to separate those ends, and further operable to move the spacer member and fingers to a position relative to the locating means, such that in use the spacer member and fingers can be positioned adjacent to an upper surface of a root portion of a plant in a tray, and then to hold the position of the spacer member constant whilst driving the fingers down past the sides of the space of member, whereby the fingers can be inserted into a root portion of a plant and, at the same time, converge to grip the root portion.

The fingers may be mounted on a support assembly, comprising a support tube, and the spacer member may be mounted on a control rod, which is movable inside the support tube to slide the spacer up and down relative to the fingers. In embodiments comprising a plurality of plant extraction means, the control rods of the spacers may be linked together so that the spacers can be slid in unison.

Preferably, the planter further comprises stop means arranged to limit movement of the spacer member or members towards a located tray so as to prevent or limit compression of a root portion surface by the spacer member. Alternatively, engagement of the spacer member with the surface of the root portion itself can be used to limit downward movement of the spacer, enabling the fingers to be driven down, at its sides, so that they can enter the root portion, converge and grip the root ball.

Certain preferred embodiments comprise a plurality of plant extraction means, arranged in a row, whereby a row of plants can be pulled out of a located propagation tray simultaneously. The plurality of plant extraction means may be mounted on a gantry, the gantry being movable over a located tray to access a number of the rows. The gantry may be movable to an extent such that it can reach all of the rows without requiring movement of the propagation tray. Alternatively, if the range of movement of the gantry is more limited, the planter may include means for moving a partially emptied tray to bring the remaining unemptied rows into range of the plant extraction means.

In embodiments comprising an array of extraction fingers on a plurality of plant extraction means, the planter preferably comprises means for actuating the respective fingers of all plant extraction means to converge substantially simultaneously.

Each plant extraction means may comprise a respective spacer member slidable inside the respective fingers, the planter comprising means for sliding the spacer members simultaneously.

Advantageously, the planter may further comprise means for adjusting the separation of the plant extraction means in the row. Thus, the planter may be adjustable to accommodate different forms of propagation trays. This can avoid the plant grower having to go to the considerable expense of perhaps purchasing new propagation trays to suit a particular planter. The planter may incorporate suitable sensors to determine the cell spacing in the propagation trays, and may also comprise actuator means for setting the extraction means spacing accordingly. Alternatively, the extraction means spacing may be manually adjustable before commencing use.

Preferably, the delivery means comprises: a delivery belt assembly arranged to convey an extracted plant from a first height to a second, lower height, the delivery belt assembly comprising two endless belts of resilient material, inclined and arranged adjacent one another so as to be able to grip the foliage part of an extracted plant between opposing surfaces of the belts; and drive means arranged to drive the belts at the same speed and such that their opposing surfaces move in the same direction. Thus, the contra rotating belts are able to gently hold the foliage part of the plants, the root portions suspended beneath the delivery belt assembly. By operating the belts at the same speed, the foliage is not rotated as the plant is conveyed, thereby avoiding damage.

Preferably, the planter further comprises means for presenting extracted plants to the delivery belt assembly such that the foliage portions of the extracted plants are engagable by the endless belts.

In certain embodiments the delivery belt assembly is arranged to drop conveyed plants onto the ground. The planter may further comprise a colter arranged to cut a slot in the ground, the delivery belt assembly being arranged to drop plants, root portion first, into the slot. Thus, dropping conveyed plants onto the ground may comprise the step of dropping the plants onto a surface which is below ordinary ground level. A pair of press wheel may be arranged to close soil around the dropped plants.

Preferably, the delivery means comprises: a delivery assembly operable to receive an extracted plant and convey it from a first height above the ground; and plant transport means arranged to receive extracted plants from the plant extraction means and present them to the delivery assembly. The plant transport means may comprise a plurality of holding ports, each port being adapted to receive a root portion of an extracted plant, and control means operable to hold the ports in a static state, whereby the ports can be loaded with extracted plants, and to move the ports to convey the received plans to the delivery assembly.

In embodiments comprising n plant extraction means, where n is an integer, the plant transport means is preferably adapted to provide n holding ports to receive n extracted plants substantially simultaneously. Thus, the plant transport means may be adapted to receive an entire row of plants extracted from the propagation tray. Preferably, the holding ports are provided by an endless belt structure, which may comprise a plurality of fin pairings, wherein each fin pairing comes together to form a holding port. Preferably, at least one fin of each pair comprises a barb for retaining a received root portion in the holding port defined by the pair. The barb is preferably provided at a predetermined height from a base of the holding port, and the height of each fin from that base is at least twice the height of the barb. This is advantageous as it helps the plant transport means to present the delivery belt structure with one plant at a time. The tall fins help keep the foliage of adjacent plants separated, and so help to avoid the instances of the foliage of two adjacent plants being "grabbed" simultaneously.

Preferably, the planter further comprises an array of extraction fingers and means for driving the extraction fingers transversely into the holding ports, whereby the extraction fingers can penetrate the sides of the root portions of plants placed in the holding ports by the plant extraction means and hold the root portions as the plant extraction means is lifted away from the deposited plants. These extraction fingers may be fins, blades, prongs or tines, or other such suitable structures. They should provide minimal damage to the root structure. With these extraction fingers pushed in through the sides of the root portions, the plant extraction means can then be lifted away from the deposited plants in the holding ports. Separation from the plant extraction means is thus assisted by the grip provided by the extraction fingers, and the barbs in the holding ports, where provided.

Preferably, the planter further comprises a second plurality of holding ports, the control means being operable to hold one plurality of holding ports in a static state to enable the plant extraction means to deposit extracted plants in the static ports, and at the same time to move the other plurality of holding ports to convey previously deposited plants to the delivery assembly. The second plurality of holding ports may be provided by a second endless belt structure.

Preferably, the planter further comprises a sensor arranged to detect foliage of a plant being conveyed by the plant transport means, the sensor being arranged to provide a signal to a controller, the controller being further arranged to control drive means of the plant transport means, whereby if no foliage, or inadequately developed foliage, is detected the plant transport means can be controlled accordingly to ensure that adequately developed plants are presented to the delivery assembly at substantially regular intervals. The sensor may be arranged to detect the foliage just before the plant is passed to the delivery belt structure. If inadequate foliage is detected, the endless belt of the plant transport means can be "speeded up", i.e. Indexed two positions forwards to bring the next viable plant Into position for release into the delivery belt system at the appropriate time.

Another aspect of the present invention provides a planter assembly for planting plants extracted from propagation trays, the planter assembly comprising a delivery belt assembly arranged to convey an extracted plant from a first height to a second, lower height, the delivery belt assembly comprising two endless belts of resilient material, inclined and arranged adjacent one another so as to be able to grip the foliage part of an extracted plant between opposing surfaces of the belts; and drive means arranged to drive the belts at the same speed and such that their opposing surfaces move in the same direction.

Preferably, the plant assembly further comprises means for presenting extracted plants to the delivery belt assembly such that the foliage portions of the extracted plants are engagable by the endless belts.

Advantageously, the planter assembly further comprises plant extraction means, arranged to extract a row of plants from a propagation tray substantially simultaneously, and a plant conveyor, arranged to receive an extracted row of plants from the plant extraction means and to present the extracted plants sequentially to the delivery belt assembly.

Preferably the planter assembly further comprises a second plant conveyor, and conveyor control means adapted to hold one conveyor in a static state for receiving extracted plants from the plant extraction means, and at the same time to move the other conveyor to convey, previously received plants to the delivery belt assembly.

Another aspect of the invention provides an automated planter comprising: plant extraction means adapted to remove a row of plants from a propagation tray; a delivery assembly arranged to receive extracted plants and deliver those extracted plants to the ground; first and second plant conveyors, each arranged to receive an extracted row of plants from the plant extraction means and to present the extracted plants sequentially to the delivery assembly; and plant conveyor control means arranged to control the conveyors such that one is held in a static state to receive an extracted row of plants from plant extraction means while the other is driven to present a previously deposited row of plants to the delivery assembly.

Yet another aspect of the invention provides method of planting plants from a propagation tray, the method comprising steps of: Inserting at least one insertion member into the root portion of a plant in the propagation tray, through the upper surface of the root portion, to grip the root portion; pulling the plant out of the propagation tray; presenting the extracted plant to delivery means; and using the delivery means to convey the extracted plant to the ground.

Preferably, the method further comprises the step of pushing the foliage of the plant to one side before inserting the insertion member.

Advantageously, the step of inserting may comprise driving at least two fingers into the root portion from the foliage side.

Preferably, the method further comprises the steps of pulling the plant out of the propagation tray such that the base of the root portion is separated from the top of the propagation tray by a distance of no more than the height of the root portion and then moving the extracted plant transversely to the upper surface of the propagation tray, whereby the plant can be separated from adjacent plants, with which its foliage may have been entangled, without pulling those adjacent plants out of the propagation tray. For example, the plant may be lifted out of the propagation tray such that the base of its root portion clears the top of the tray by 10-20 mm, and then the plant may be translated sideways.

Preferably, the method further comprises the step of pulling out a row of plants simultaneously from the propagation tray.

Preferably, the method further comprises the step of approaching the row of plants from a direction transverse to the row and pushing the foliage of the row of plants to one side before inserting the insertion members.

Advantageously, the method may further comprise the steps of holding the extracted row of plants in alignment and translating the line of plants in a direction perpendicular to that line; depositing the line of plants in a conveyor structure having a plurality of holding ports aligned with the line of plants; and operating the conveyor structure to move the deposited plants in line to present them in sequence to the delivery means.

Another aspect of the invention provides an automated planter assembly comprising: a planting device; plant extraction means having a plurality of members, which remove a row of plants from a propagation tray and deposit them on a plant transport means; propagation tray locating means, which position each propagation tray relative to the plant extraction means; and plant transport means having a static state, wherein the transport means presents a plurality of holding ports to receive the row of plants, and a moving state, wherein the holding ports transport the plants to the planting device.

It will be understood by the skilled man that propagation trays consist of a plurality of planting cells arranged in a grid formation.

Preferably, the spacing between each plant extraction member is such that extraction means correctly aligns with a row on a standard propagation tray.

Preferably, each plant extraction member may comprise at least two fingers, mounted on a main body, and an actuator means, which causes the fingers to converge, wherein, in use, the fingers engage an individual plant in the propagation tray.

It will be understood that the converging fingers will pinch the soil and root portion of the plant and hold it gently, yet firmly, thus permitting its removal from the propagation tray.

Advantageously, the actuator may be slidably mounted on the fingers such that the movement of the actuator in one direction causes the fingers to converge, whereas movement in the opposition direction causes the fingers to align substantially parallel to one another.

Preferably, the number of members on the plant extraction means may correspond to the number of cells in a row presented by the propagation trays located in the propagation tray receiving means.

Advantageously, the actuator means may all be controlled by a common control means so that the row of individual plants may be engaged simultaneously.

Preferably, the propagation tray locating means comprises a sensor to determine the number of rows of plants held (i.e. the number of rows in the propagation tray), wherein this data is fed back to an operating system. Further preferably, the propagation tray may have markings thereon, which alert the system to its dimensions.

The plant extraction means may move relative to the propagation tray locating means so that once the plants have been removed from a row the extraction means moves on to the next row. Alternatively, the propagation tray locating means may move the tray so that a full row of plants is always presented to the extraction means.

The plant transport means may comprise a continuous track of holding ports, which receive the soil and root portion of the plants, and a control means, which determines whether the track is moving or static.

Preferably, the continuous track comprises a plurality of fin pairings, wherein each fin pairing comes together to form a holding port.

Advantageously, the plant transport means may comprise two continuous tracks of holding ports, so that when the first track is static the second track may be moving. In this way, one track can be filled with a row of plants from the extraction means whilst the second track is transporting a row of plants to the planting device, thus reducing the down time of the system.

The nature of this assembly is such that a computer system is required to coordinate at the associated movements of the planter assembly.

Preferably, the locating means comprises: a housing that holds the propagation tray(s), which are being worked on by the extraction device; a waiting area where the next propagation tray(s) are stored; and a transport mechanism, which replaces the emptied propagation trays with fresh propagation trays.

Preferably, each extraction member comprises four fingers and an actuating means, located at one end thereof. An end of each extraction member opposite to the fingers may be connected to a common control bar.

Preferably, the extraction means is arranged to lift each plant out of its respective cell in a propagation tray.

Preferably, the assembly may further comprise an ejection device arranged to ensure release of the plants from the extraction means into the holding ports.

The ejection device may comprise a pin.

Preferably, the planting device comprises a planter delivery belt. The delivery belt may comprise two contra rotating belts of soft rubber arranged to travel at the same speed.

Advantageously the assembly may further comprise means for varying the rate at which each plant is presented to the delivery belt to determine how far apart they are planted in the ground.

Another aspect of the invention provides a planter assembly as previously described in combination with a propagation tray comprising a plurality of planting cells arranged in a grid formation, the spacing between each plant extraction member being arranged such that the extraction means correctly aligns with a row of cells on the tray.

Preferably, the number of members on the plant extraction means corresponds to the number of cells in a row of the tray.

In certain preferred embodiments the propagation tray comprises markings arranged to alert a control system of the assembly to the tray's dimensions.

Another aspect of the invention provides method of extracting and planting plants from a propagation tray, the method comprising the steps of: positioning the propagation tray relative to a plant extraction means with propagation tray locating means; removing a row of plants from the tray using the plant extraction means; depositing the row of extracted plants on a plant transport means, the transport means having a plurality of holding ports to receive the row of plants; operating the plant transport means to transport the deposited plants to a planting device; and operating the planting device to deliver the plants to the ground.

The step of removing the plants may comprise removing the row of plants substantially simultaneously from the tray.

Preferably, the step of extracting the plants comprises: inserting a respective at least two fingers into the soil and root portion of each plant; causing the fingers to converge; and lifting the plant out of its cell.

Preferably, the step of causing the fingers to converge comprises pinching the soil and root portion of the plant.

Preferably, the step of depositing the row of extracted plants comprises returning the fingers to a substantially parallel alignment.

Preferably, the transport means comprises at least two tracks, the method further comprising the steps of depositing an extracted row of plants in the holding ports of a first, stationary one of said tracks, and simultaneously operating a second one of said tracks, in which another row of plants had previously been deposited, to transport said another row to the planting device.

BRIEF DESCRIPTION OF THE DRAWINGS

In the drawings, which illustrate preferred embodiments of the invention:

FIGS. 6 to 9 show, schematically, components of a plant extraction mechanism suitable for use in embodiments of the invention;

FIGS. 10 to 13 are views of components of the plant extraction mechanism from FIGS. 6 to 9 in use to extracted a plant from a propagation tray;

FIGS. 14 to 17 are schematic side views of a plant extraction mechanism being used to extract a plant from a propagation tray;

FIG. 18 is a schematic representation of an extracted plant being deposited in a holding port of a plant conveyor;

DETAILED DESCRIPTION OF THE PREFERRED EMBODIMENTS OF THE INVENTION

Figure 1:
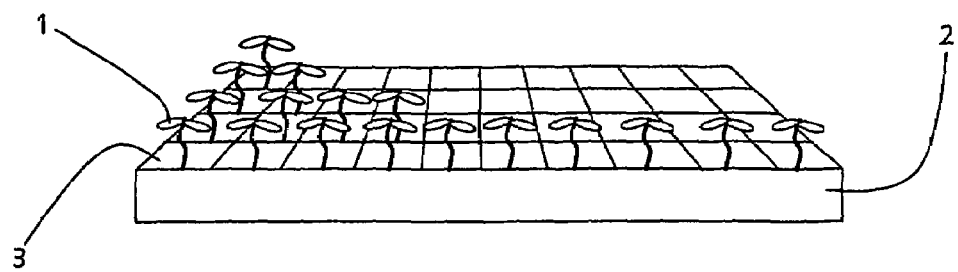
FIG. 1 is a diagrammatic representation of a propagation tray.

It is standard practice to grow plants 1 from seed in propagation trays 2. Such practice allows the farmer to easily control the plant's environment until it has grown to a suitable age. Propagation trays come in a range of sizes, and can have a range of cells 3 therein. The type of propagation tray used can depend on the type of plant being grown. In FIG. 1, a typical propagation tray 2 is illustrated; the tray is partially stocked with plants 1, each plant having its own individual cell 3.

Certain embodiments of the invention carry out the task of extracting plants, from such propagation trays, and plant the extracted plants in the ground.

Extraction of the plants from their propagation trays, and transport of the plants to an automated planting device are functions which are automated in certain embodiments of the invention.

Figure 2:
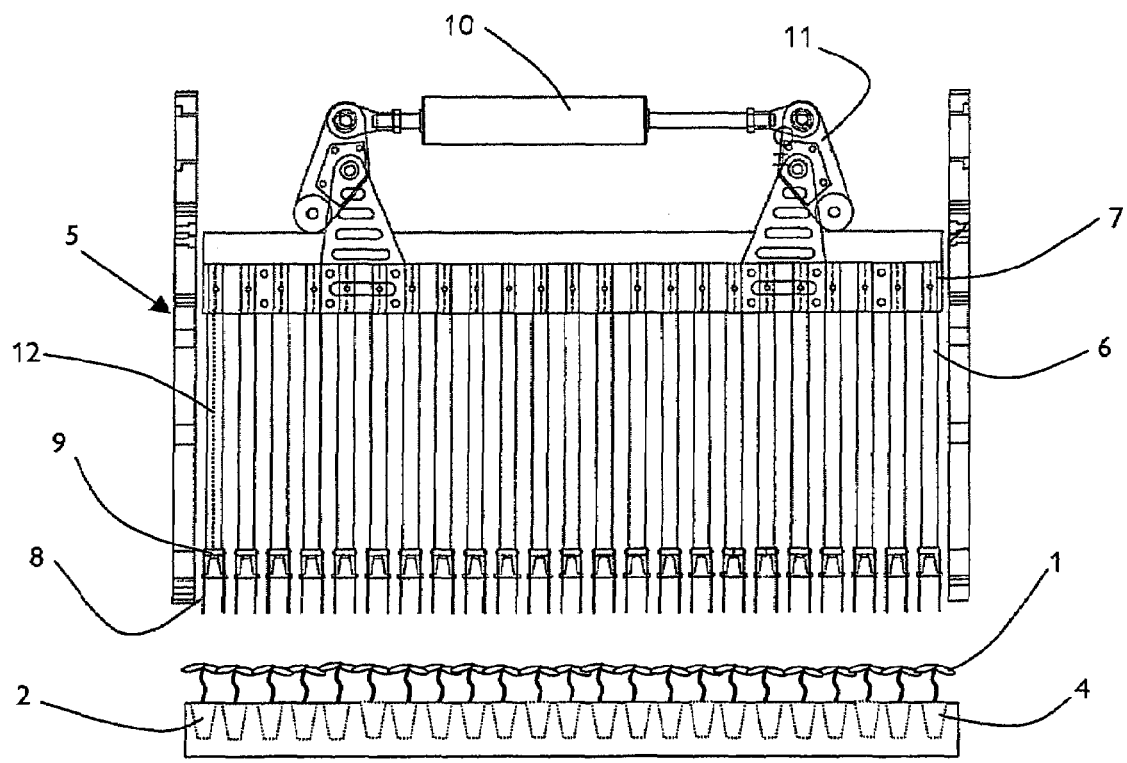
FIG. 2 shows the alignment between a propagation tray and the extraction means.
Figure 3:
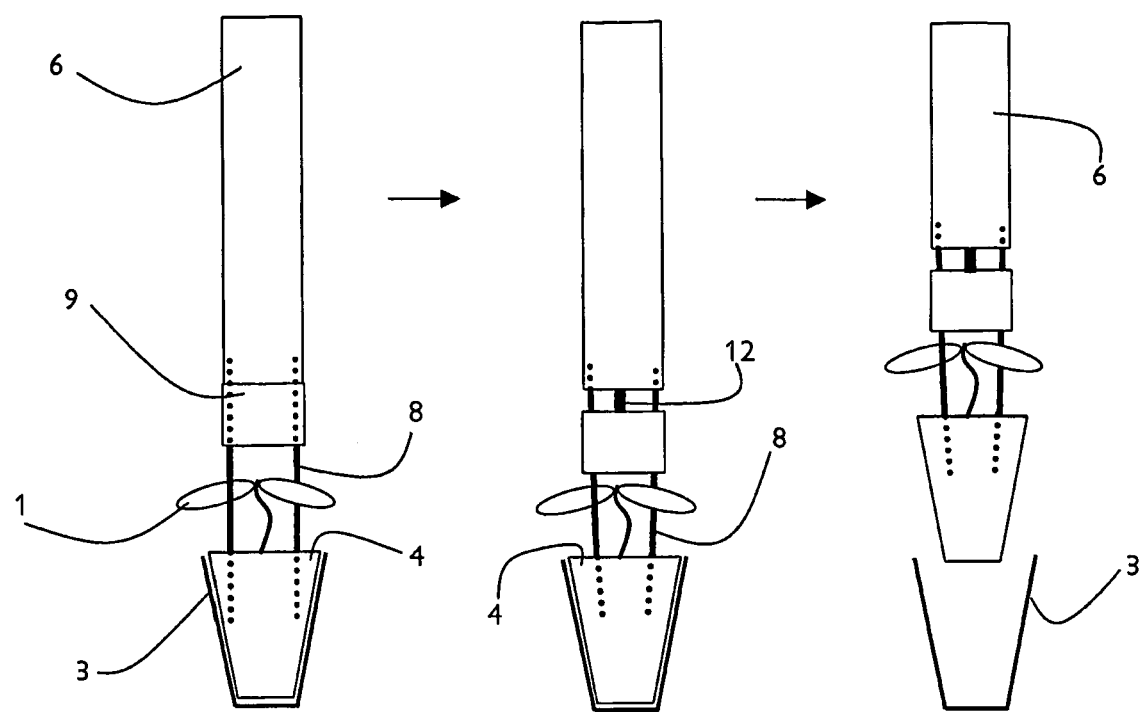
FIG. 3 shows the process by which an individual plant is removed from a cell of the propagation tray.

FIGS. 2 & 3 illustrate the components used, in a preferred embodiment, to automate the extraction function.

In FIG. 2, the alignment of the propagation tray 2, and thus the plants 1, relative to the extraction means 5 can be appreciated. The alignment of the tray 2 with the extraction means is controlled by the propagation tray locating means (not shown). In the preferred embodiment, the locating means comprise: a housing that holds the propagation tray (s), which are being worked on by the extraction device; a waiting area where the next propagation tray(s) are stored; and a transport mechanism, which replaces the emptied propagation trays with fresh propagation trays. A piston arrangement is used in the preferred embodiment, but alternative mechanisms will be appreciated by the skilled man.

In the preferred embodiment, the extraction means 5 has twenty-three extraction members 6, this number corresponds the number of cell in row on a standard propagation tray 2. It is appreciated that alternative numbers of extraction members may also be used effectively.

Each extraction member 6 has four fingers 8 and an actuating means 9, located at one end thereof. The alignment of the tray 2 and the extraction means 5 is such that each extraction member 6 is aligned with an individual cell 3 of the tray 2. At the opposite end of the extraction member 6 to the fingers 8 the member is connected to a control bar 7; all of the separate extraction members are connected to the control bar 7.

The control bar is driven by a single piston 10 and a self-balancing rotor mechanism 11. This arrangement ensures that equal pressure Is enforced by each extraction member 6, thus preventing the system from locking up. Each extraction member 6 has a remote control device 12 that passes the drive of the piston 10 on to the actuator 9, located on each extraction member 6.

The interaction between each individual extraction member 6 and an individual plant 1 can be better appreciated from FIG. 3, which shows a three stage process whereby the plant is removed from its cell in the propagation tray.

Once the plant is aligned with the extraction member, the member moves towards the plant thus causing the fingers 8 to be inserted into the base of the plant 4 (comprising soil and roots). The depth the fingers 8 pass in the base 4 is determined by the type of propagation tray being used. Once the fingers 8 have reached the desired depth, the actuator 9 is activated by remote control means 12.

The shape of the actuator is such that as it is forced down the fingers 8 are caused to converge. The convergence of the fingers 8 imparts a pinching action on the plant base 4 and holds it firmly.

Once the plant is held firmly, the extracting member 6 lifts it out of its cell 3 in the propagation tray. In order to retain the plant, the actuator 9 is maintained in the active position. To detach the plant from the extraction member 6 the actuator returns to its original position, thus allowing the fingers 8 to return to their original, substantially parallel, alignment.

It is appreciated that the number of fingers and their spacing may vary depending on the dimensions of the cell size of the propagation tray being worked. The only limitation on the number of fingers is that there must be at least two, so as permit the pinching mechanism.

Figure 4:
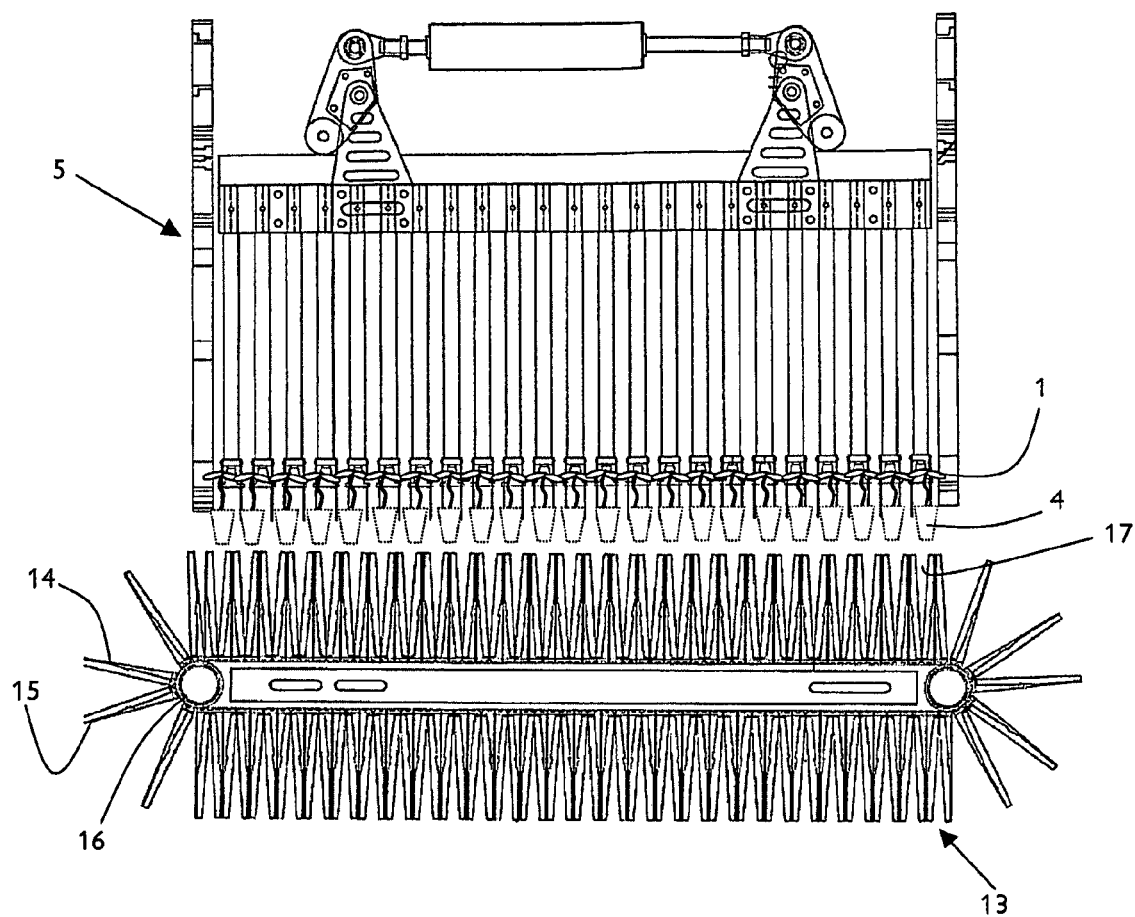
FIG. 4 shows the alignment between the extraction means and the transport means which permits a row of plants to be transferred.
Figure 5:
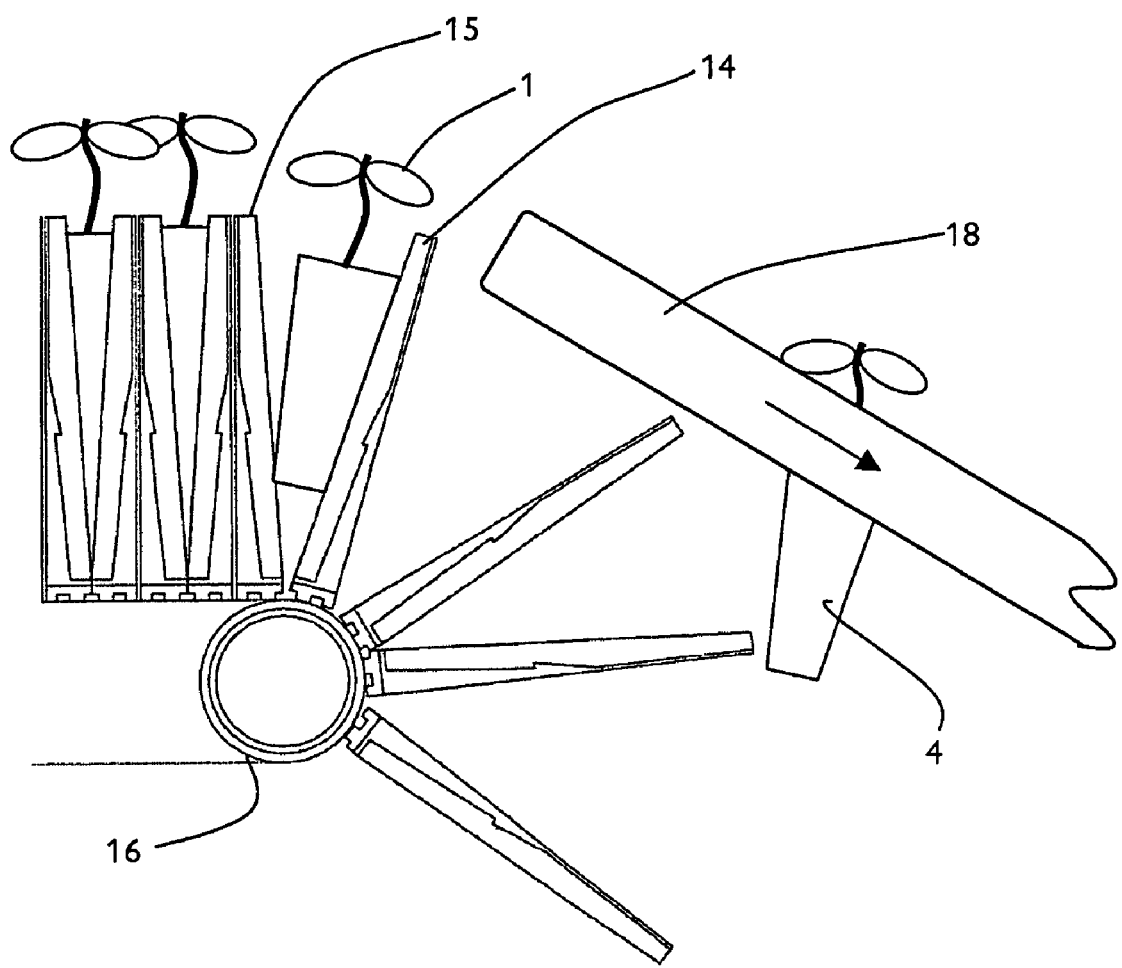
FIG. 5 shows how each individual plant is taken from the end of the transport means by the planter device.

Once the row of plants has been extracted from the propagation tray it moves on the second function that is automated by certain embodiments of the invention, namely the transport and presentation of the individual plants to the planting device. FIGS. 4 & 5 show the components involved in automating this function in the preferred embodiment.

The alignment of the extraction means 5, laden with a row of extracted plants 1, and the plant transport means 13 can be appreciated from FIG. 4.

In the preferred embodiment, the plant transport means 13 comprises two continuous tracks 16 on which is mounted a plurality of fins. There are two types of fin, and they are arranged alternately around the body of the track. Fins 14 & 15 are arranged so that when they come together they form a holding port 17. The holding port 17 is shaped so to receive the plant base 4 of an individual plant 1. The alignment of the extracting means 5 and the transport means 13 is such that each plant 1 locates within a holding port 17. It is appreciated that the number of holding ports on a track should be at least double the number of extraction members on the extraction means.

The tracks 16 are arranged side by side and are driven by a common drive means. When the system is in operation, only one track is ever moving. In this way, one track can be loaded with plants while the other is transporting its load to the planting device. A clutch arrangement (not shown) allows the movement of the two tracks 16 to be alternated appropriately.

When transferring the plants from the extraction means to the holding ports of the transport means, the retraction of the actuator should be enough to release the plants. It is appreciated that an additional ejection device may be incorporated to ensure release of the plants into the holding ports 17. A suitable ejection device may involve a pin driven by the control bar.

Once the row of plants has been deposited on the transport means (sensor means may be involved to monitor state of plant deposition), the loaded track 16 carries the plants to the planting device.

FIG. 5 shows how each individual plant 1 is passed on the automated planting device. At the end of the plant transport means is located a planter delivery belt 18. The delivery belt 18 comprises two contra rotating belts of soft rubber that travel at the same speed. It is important that the belts travel at the same speed so that the plants, which are held by their stalks, foliage, leaves or leaf area, are not rotated and damaged as they travel along the belt to the planting device.

The positioning of the delivery belt 18 is such that, as the fins 14 & 15 are turning the corner of the track 16 and are moving apart, the stalk, foliage, leaves or leaf area of each plant 1 is presented to the delivery belt 18. The delivery belt 18 picks up the plants and transports them to be planted.

The rate at which each plant is presented to the delivery belt can determine how far apart they are planted in the ground. It is appreciated that other factors can be varied to control the distancing of the plants.

The man skilled in the art will appreciate that it is necessary to include sensors through out the system, to ensure that the functions run smoothly. Suitable sensors include lasers, photo-electric and ultrasonic types.

In order to coordinate the various components of the system a central computer is used, which collects information from the various sensors located around the system.

Referring now to FIG. 6, an extraction mechanism 6 suitable for use in the plant extraction means of the embodiments of the invention comprises two pairs of sprung metal fingers 8. These fingers can also be referred to as prongs. The fingers have been formed in a curved shape, and the resilience of their material means that, although their tips 84 can be urged apart, the tips are biased together. The pairs of fingers are attached to a support block 81 by means of screws 82. The support block 81 is in turn connected to and supported on the end of a support cylinder 83. A control rod 94 extends through a holding the support block 81 and through the hollow support cylinder 83 and is attached to a spacer block 90. The spacer block is located between the pairs of fingers, and speak curvature of the sprung fingers maintains them in contact with the side surfaces 93 of the block 90. The rod 94 is movable, up and down relative to the support block 81, and so can be used to slide the block 90 up and down between the sprung fingers. FIG. 6 shows the spacer block 90 retracted to a position in which It permits the ends 84 of the sprung fingers 8 to converge and almost meet. FIG. 7 shows the control rod 94 in an extended position, such that the block 90 has been slid to the ends 84 of the fingers, causing those ends or tips 84 to be pushed apart. In this configuration, the fingers have slight curvature, but are substantially parallel.

FIG. 8 is a side view of the extraction mechanism, with the block 90 in the extended position, as in FIG. 7. The two fingers or prongs 8 of the visible pair have been laser cut from sheet material. As can be seen, the tips of the teeth 8 do not extend beyond the lower edge of the block 90 in this configuration. Thus, the teeth are protected from damage, and this is the configuration in which the extraction mechanism is to be moved around the planter apparatus when it is not carrying an extracted plant. It will also be appreciated that, by accommodating the spacer or guide block 90 wholly between the opposed pairs of fingers 8, the footprint of the extraction mechanism is reduced.

FIG. 9 is a schematic perspective view of the spacer block 90 mounted on the actuator control rod 94. In this embodiment, the guide block is formed from nylon, but other materials may be used. Also, a front, or leading, face 92 of the block 90 incorporates a cut-out 91 for receiving and locating a stalk of a plant.

FIG. 10 shows a nominal front view of the extraction mechanism from FIGS. 6 to 9, with the block 90 and control rod 94 in the extended position, and positioned with a lower surface of the block 90 in contact with the outer surface 40 of the root and soil portion 4 of a plant to be extracted. A stalk 42 of the plants is received in the cut-out 91 in the front face of the block. This is Illustrated in the partial plan view of FIG. 13. The stalk 42 has been pushed slightly forwards, the cut-out 91 permitting the block nevertheless to be accommodated wholly within the perimeter of the upper soil surface 40. The propagation tray defines a cell 3 which has an upper surface 32, and a lower drainage hole 31. The foliage portion 41 of the plant is indicated generally by the broken line. In FIG. 11 the support cylinder 83 has been driven downwards, towards the propagation tray. The block 90 has not been driven downwards, and is maintained in contact with the upper surface 40 of the root portion of the plant. Thus, the fingers 8 that were previously spaced apart have been driven down past the sides of the block 90, through the surface 40 and into the root portion 4 of the plant. At the same time, their sprung nature has caused their tips 84 to converge, thereby pinching (i.e. gripping) the root ball. With the fingers 8 gripping the root ball 4, the support tube 83 is then pulled upwards to extract the plant from the cell 3, as shown in FIG. 12.

The gripped plant can then be moved to a desired position, for example to a stationary indexing belt, and then released in the following way. The support tube 83 can be held at a particular position, and the spacer block 90 can be driven downwards in relation to the fingers, to drive the root ball off the fingers. As the block pushes downwards on the root-ball upper surface, it slides down between the fingers and causes them to straighten.

Referring now to FIG. 14, this shows a side view of two rows of plants in a propagation tray. Only the ends of plants of the rows are visible. A plant extraction means comprising a row of plant extraction mechanisms 6 is also shown, and again only the end mechanism of the row is visible. Each mechanism comprises an array of fingers 8, insertable into the root portion of a plant, and an actuator block 90 driveable with respect to the fingers by means of a control rods 94 to control a pinching action of the fingers. The fingers are supported on a support block 81 and support tube 83. The plant extraction means is operated to move the extraction assemblies 6 in unison in the direction shown by the arrow A. Thus, the extraction assemblies are lowered towards the upper surface 32 of the propagation tray and are swept in any direction generally perpendicular to the row of plants to be engaged and extracted. FIG. 15 shows the row of extraction devices 6 in position, over the first row of plants, just before the pins 8 inserted to grip the plant. In this embodiment, a stop is provided in the plant extraction means to limit the downwards movement of the array of spacer blocks 90 so that, although they come close, they do not actually touch the upper surface 40 of the plants. Thus, compression of, and damage to the root bail by the blocks 90 is avoided. As can be seen, the act of bringing the row of extraction devices 6 into the position shown in FIG. 15 has pushed (i.e. deflected) the foliage 41 of the first row of plants to one side, in particular towards the adjacent row. Although not visible in the figure, the blocks 90 incorporate cut-outs in their leading faces to receiving and accommodate the stalks 42. The cut-outs and the shape of the blocks are not essential to the fundamental operation of the extraction means, but do provide advantages. FIG. 16 shows the next stage in the extraction method. Here, the support tube 83 has been driven down to urge the pins 8 down past the sides of the stopped block 90 and into the root portion 4. FIG. 17 shows the final step in the extraction process. The support assembly has been pulled up and away from the propagation tray, lifting the base 44 of the root portion completely out of its cell 3, above the upper surface 32. However, before the height of the base 44 of the extracted plant above the upper surface 32 of the tray exceeds the depth of the root portion, the plant extraction means begins to sweep the extracted plants in direction transverse to the tray surface. This enables the foliage 41 to be separated from that of the adjacent row, with which it may have been entangled, without lifting plants in the adjacent row out of the tray. Thus, the motion of the extracted plant is shown generally by arrow A. The extraction method and therefore the summarised as approaching a row of plants from the side, pushing the foliage over to permit better access to the root portion, inserting one or more members into the root portion to grip it, pulling the gripped roots out of the propagation tray, and then "tearing" the extracted row of plants sideways from an adjacent row of plants still housed within the tray.

From the position shown in FIG. 17, the row of gripped, extracted plants is then transported by the plant extraction means and deposited in an array of holding ports 17, an end view of which is shown in FIG. 18. An actuator 51 is then used to drive an extraction member 50 (which may be a pin, blade, or other such device) into the root portion 4 from the side (i.e. it is driven generally transversely into the root portion). Then, to release the plants from the extraction means, the position of the blocks 90 is held constant whilst the support tube 83 are pulled upwards. This withdraws the pins 8 from the root balls. The array of extraction mechanisms can then be moved back to extract another row of plants from the propagation tray. As the extraction assemblies are pulled up and away from the holding ports 17, the Inserted extraction members 50 assist proper release, by preventing upwards movement of the plants. When the extraction assemblies have been fully withdrawn away from the holding ports, the actuator 51 then withdraws the extraction pins 50 to permit the held plants to be conveyed in line to a delivery mechanism to deposit them in a prepared ground surface.

Figure 19:
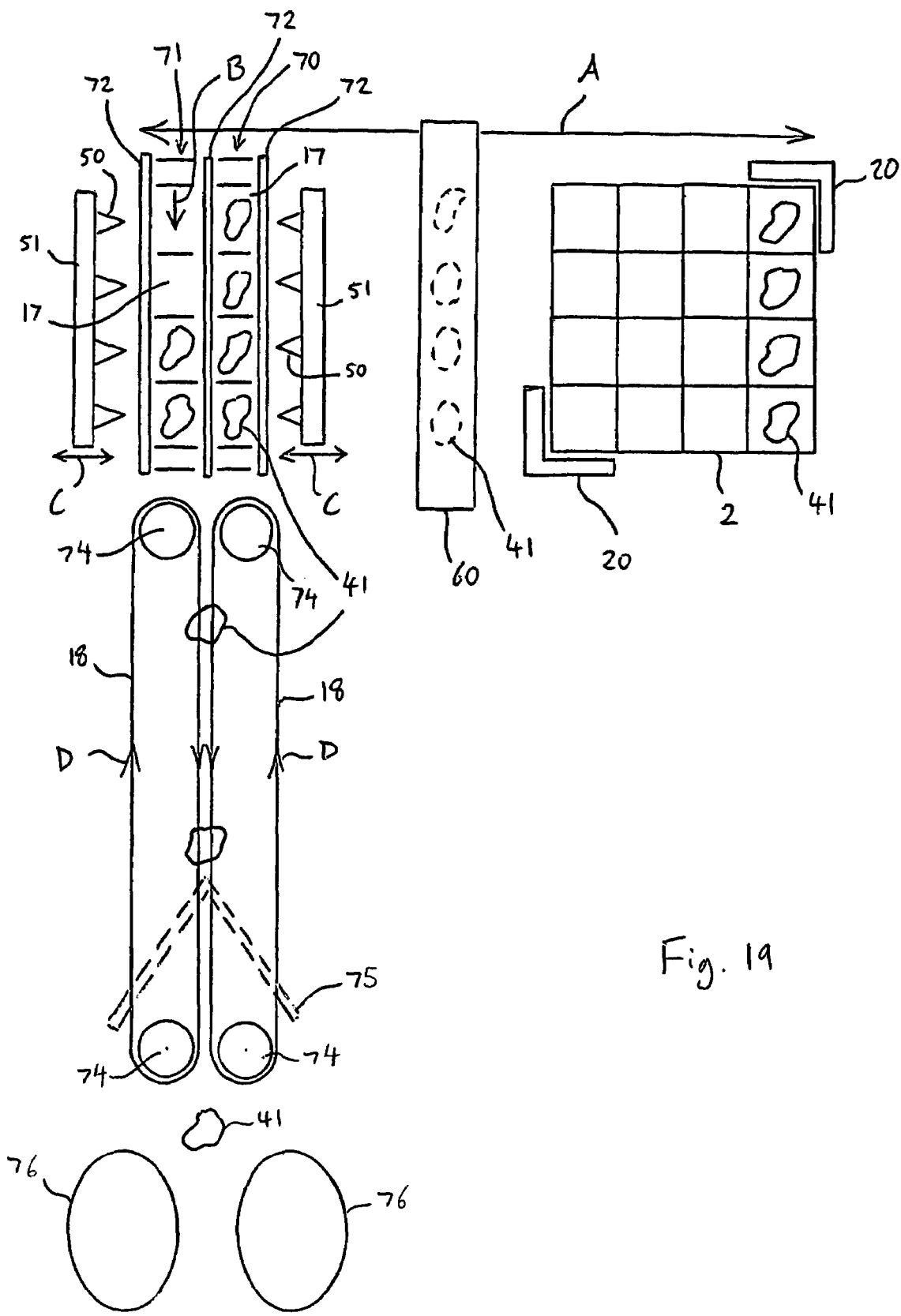
FIG. 19 is a schematic plan view of the components of an automated planter embodying the invention.

Referring now to FIG. 19, another embodiment comprises propagation tray locating means 20 arranged to locate and hold in a predetermined position a propagation tray 2. In this simplified example, there are 16 cells in 4 rows, three of which have already been emptied. An array of four plant extraction mechanisms are supported on a gantry 60 which is movable over the tray 2 in a direction shown generally by arrow A. In the figure, the array of extraction mechanisms has picked up a row of plants, whose foliage is shown by broken lines 41. The planter comprises a first, conveyor 70 and a second conveyor 71, each of which provides a plurality of holding ports 17 for receiving extracted plants from the plant extraction means. The gantry 60 is able to move over both conveyors to deposit extracted plants in their holding ports. The conveyors are separated by separating plates 72 which help prevent tangling of foliage between plants in the adjacent conveyors. For each conveyor, an array of extraction blades 50 is provided, supported on a common drive bar 51. When the extraction means places the row of plants in the holding ports the drive bar 51 is moved to insert the blades 50 into the sides of the root portions to hold them in the holding means while the extraction means is withdrawn, ready to extract another row of plants. Then, the blades 50 are themselves withdrawn. Movement of the drive bars 51 is indicated generally by arrows C. Control means, not shown in the figure, is provided, and which is able to hold one of the conveyors in a static state while it operates the other to transport deposited plants to a delivery mechanism. In the figure, conveyor 70 is shown in its static state, and contains a complete row of deposited plants. Conveyor 71 is being operated by the control means. Its motion is not continuous, but rather comprises a series of indexed steps to present the row of deposited plants sequentially, at predetermined intervals, to the delivery assembly. The delivery assembly comprises two soft rubber endless belts 18, guided and driven by wheels 74 so as to rotate at the same speeds but in opposite directions. The belts are arranged next to each other such that they can take in the foliage of a plant, hold it, and convey it to the ground. The foliage of two plants, held and being conveyed by the drive belts 18, are shown schematically in the figure. Rotation of the belts is shown by the arrows D. In this embodiment the belts 18 are arranged to catch the foliage of plants conveyed by both conveyors. In other embodiments, the belt arrangement may be movable between a first position in which it catches plants from a first conveyor and a second position in which it catches plants from the second conveyor. The planter also comprises a colter 75 arranged to cut a slot or furrow in the soil. The belts 18 are arranged to release the plants they convey into the slot. A pair of press wheels 76 is arranged to trail the colter, to fold in and compact the disturbed soil around the deposited plants. This arrangement tends to yield a relatively loose central strip of soil in which the plants are planted, with relatively compacted soil on either side. This is advantageous from the point of view of water supply to the growing plants. The looser soil tends to sink when watered, yielding a depression in which the root ball sits. This helps to retain water, supplied subsequently, around the roots.

Figure 20:
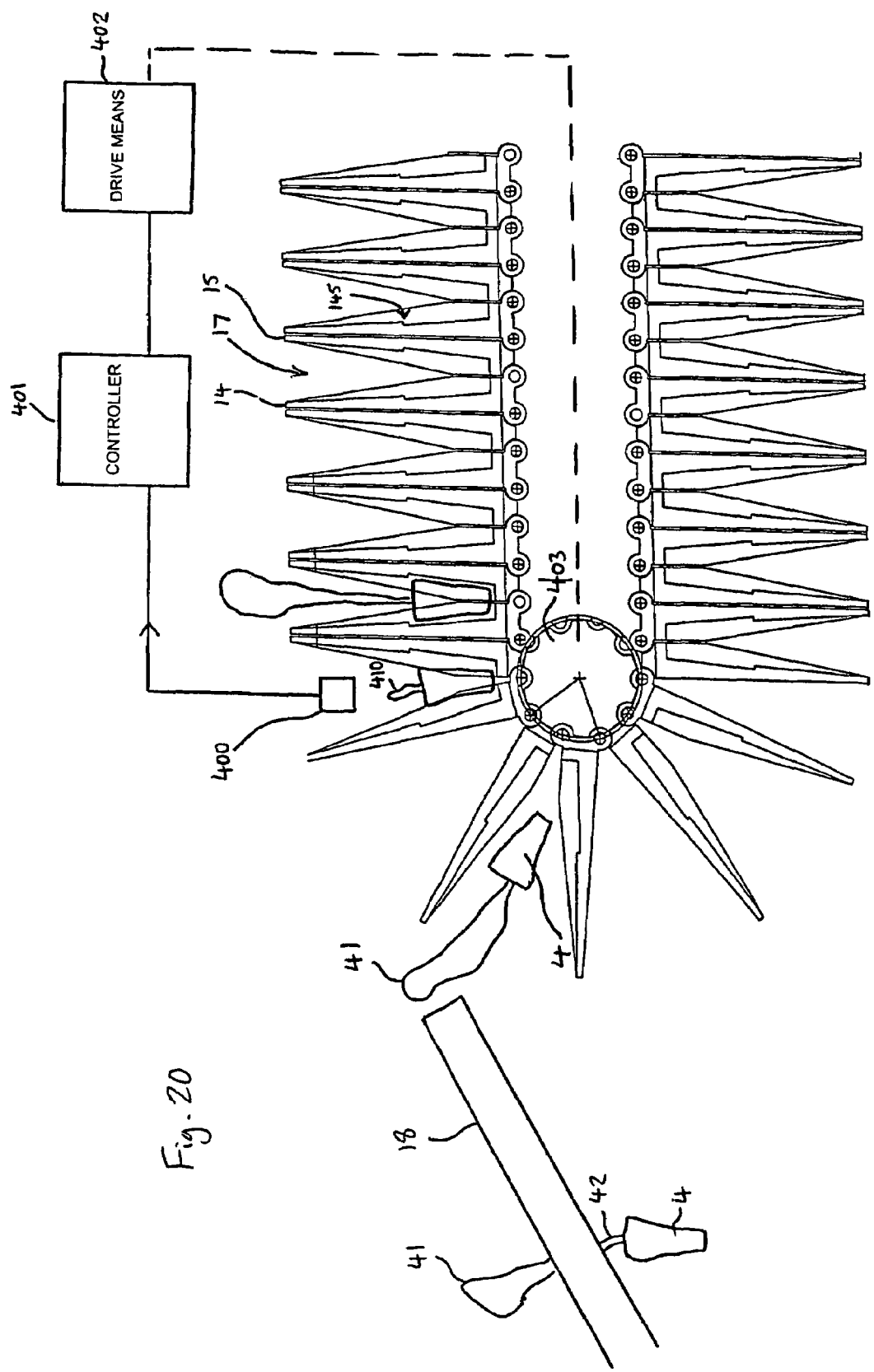
FIG. 20 is a schematic side view of components of an automated planter assembly embodying the Invention.

Looking now at FIG. 20, this shows part of a plant conveyor suitable for use in embodiments of the invention. The conveyor comprises a plurality of fin pairs 14, 15, which are linked together in chain-like fashion to create an endless belt. The pairs of fins come together to define holding ports 17 for holding plants. As the fins travel around drive wheels 403 the holding ports open to release the previously held plants. Each fin comprises a barb 145 directed inwardly into the holding port 17 to assist retention of the received plant until it is due for release. The fins extend to a height which is approximately twice that of the barb height from the base of the holding ports. These high fin walls help to keep the plants separated, and together with the plants help prevent plants being dragged out prematurely when an adjacent plant is released, and whose foliage may have become entangled. The figure shows, in highly schematic form, one plant in the process of being released. Its foliage 41 is about to be captured by a delivery belt assembly 18. A previously released plant is being conveyed downwards by the delivery belts 18, with its foliage and stalk being gripped such that its root portion 4 is suspended below the delivery belt mechanism. A sensor 400 is arranged to detect the foliage of plants in the holding ports just before they are due to be released to the delivery mechanism. The sensor sends a signal to a controller 401 which then controls drive means 402 coupled to the drive wheels 403 of the conveyor. In the figure, the holding port currently aligned with the sensor 400 contains a plant whose foliage 410 is inadequately developed. The sensor 400 senses this and the conveyor, after releasing the preceding plant, quickly indexes forward two positions so that the delivery belt arrangement 18 receives properly developed plants at a relatively uniform rate. As the foliage 410 is inadequately developed, it cannot be captured by the delivery belts 18, and is simply discarded onto the floor as the conveyor is advanced.

The sensor 400 in FIG. 20 is shown in a position such that it can detect foliage down within a port defined by the fins. However, it will be appreciated that the sensor may be arranged in other positions. For example, the sensor may be arranged slightly above the upper ends of the fins as they travel along, to sense foliage protruding from the holding ports.

A variety of sensors may be used. For example, optical sensors may be used, foliage being detected by sensing the breaking of an optical beam.

Figure 21:
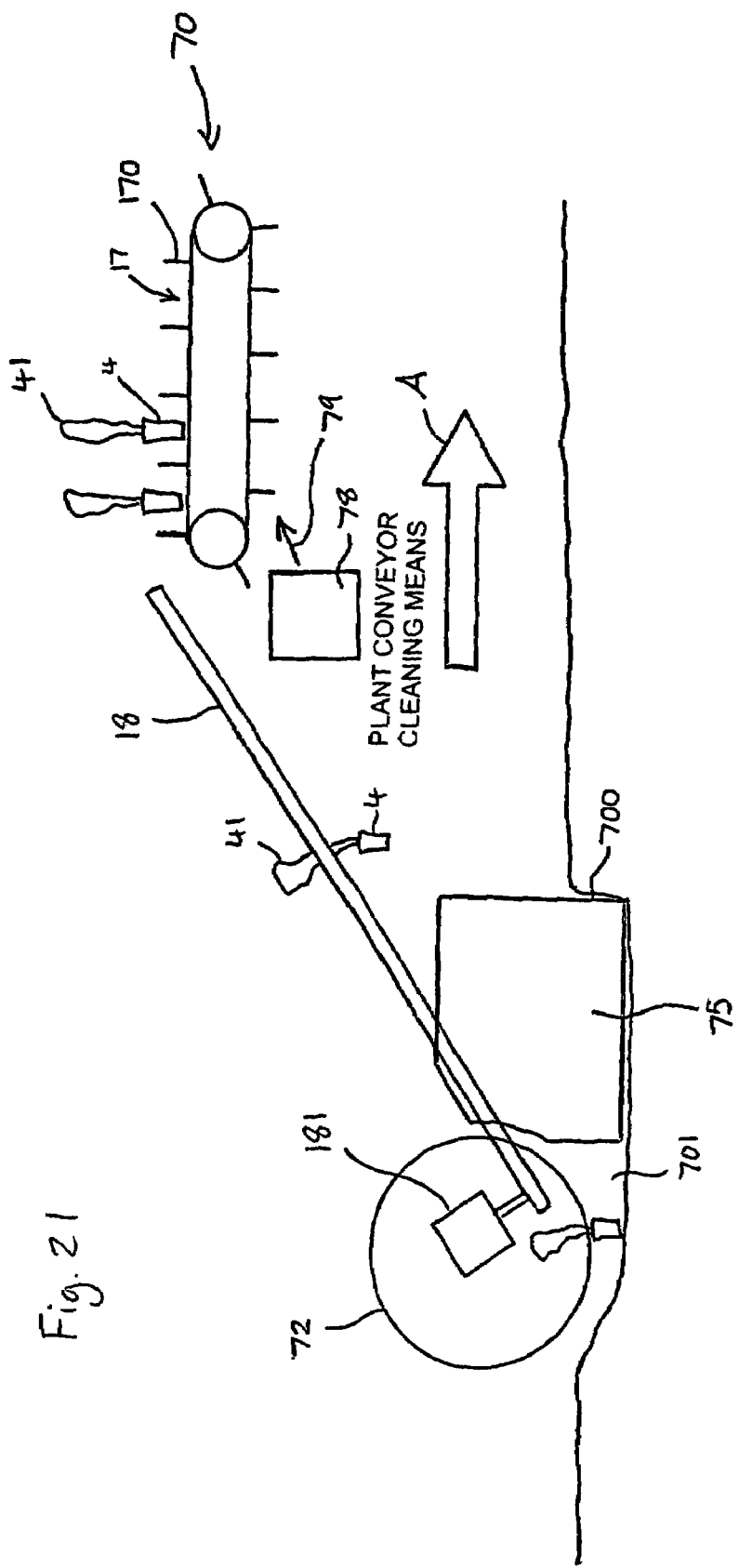
FIG. 21 is a schematic side view of another automated planter embodying the invention.

The automated planter shown in FIG. 21 comprises a conveyor 70 carrying a plurality of sidewalls 170 on an endless belt, those walls defining holding ports 17 for holding and conveying plants. As the conveyor moves the plants along their foliage is sequentially presented to a delivery belt system 18. This belt system comprises two contra-rotating soft rubber belts which grip the foliage between them and carry the plants downwards and deposit them, root portion first, into a slot 701 cut by a colter 75 with a sharp leading edge 700. Press wheels 77, for firming the soil around the deposited plants are arranged to trail the colter. The direction of travel of the device during the planting operation is shown generally by arrow A. The planter also comprises plant conveyor cleaning means 78 which, in this embodiment, is arranged to direct a jet of air at the returning portion of the conveyor belt to clean out the holding ports. In other embodiments, other methods may be used to clean the ports. For example, steam and/or brushes may be used.

Figure 22:
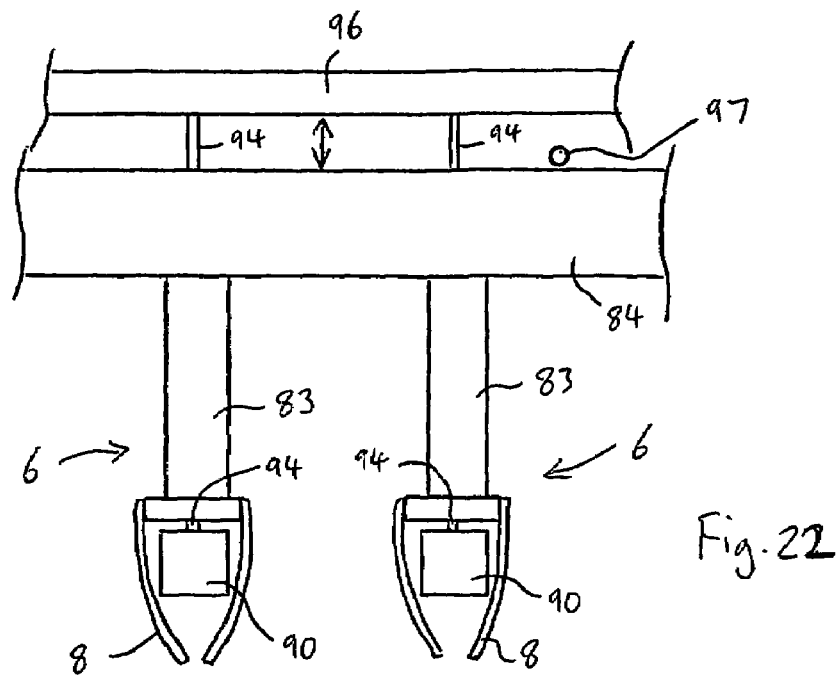
FIG. 22 is a schematic view of part of the plant extraction means of a planter embodying the invention.

FIG. 22 shows part of the plant extraction means of another embodiment. The extraction means comprises a plurality of extraction assemblies 6 with support tubes 83 connected to a common support bar 84 such that they can be driven up and down simultaneously. Control rods 94 extend through the common support bar 84 and tubes 83 and carry the spacer blocks 90 used to actuate the pinching operation of the insertion fingers 8. The control rods 94 are coupled to a further common support bar 96 so that they also can be driven in unison. Downwards motion of the blocks 90 in this embodiment is limited by a stop member 97 arranged to limit movement of the second support bar 96. It will be appreciated that in alternative embodiments the stop may be omitted.

Figure 23:
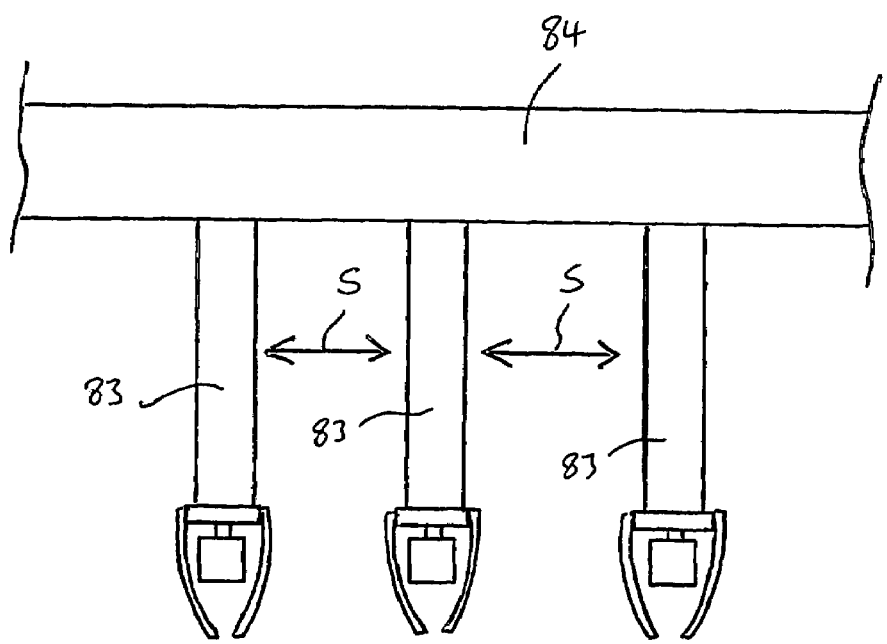
FIG. 23 is a schematic view of part of another plant extraction means of an embodiment of the invention.

FIG. 23 shows part of a further embodiment, where a plurality of extraction devices on support tubes 83 are suspended from a support gantry 84, which includes actuation for adjusting the separation S of the extraction mechanisms to suit the particular propagation tray.

It will be appreciated that certain embodiments of the present invention provide advantages by employing at least two indexing belts (plant conveyor belts) so that one may be loaded while the other is operated to transport the plants to the delivery mechanism.

The delivery mechanism using contra-rotating soft belts to grip plant foliage handles the plants in a controlled and delicate way, and provides a further advantage that undeveloped plants are automatically rejected as there is no foliage to grip.

Even if adjacent plants in the propagation trays become entangled, embodiments of the invention can easily separate them by pulling a row of plants first in one direction, to separate it from an adjacent row, and then by sequentially presenting the plants in the row to a delivery belt arrangement which pulls each plant from its neighbour in a direction in line with the row.

In certain embodiments, to remove the plants from the propagation trays the plant extraction means may comprise stainless steel fingers mounted on the end of aluminium tubular bars. The fingers may incorporate a moulded plastic foot 90 that is connected to an extraction pin 94, that runs through the centre of the aluminium tube. This enables the plants to be picked out of the propagation trays with the stainless fingers, compressing themselves around the root system of the plant. The fingers may be held on a carriage frame that is driven on two planes by servo motors. By using these motors great accuracy and speed can be achieved, enabling very high planting speeds. Dispatching the plants off the ends of the fingers is achieved by sliding the plastic foot down the fingers using the extraction pin. The method of operating these extraction pins is by a pressure compensating pneumatic cylinder acting on the push off bar. The method of individually selecting plants for planting in the field is achieved by placing the plants in one of two specially designed belts. These belts may replicate the propagation tray profile, from which the plants have been removed. By using two identical belts it facilitates the loading of one belt, whilst at the same time enabling the second belt to be filled with fresh plants. These index belts are operated by a drive system that incorporates two clutch/brake units, driven by a common drive motor. By using this system it is possible to index individual flights of the belt at a rate of five per second and higher. While the plants are in these belts, a selection is made of which plants are suitable for planting, by examining the foliage of the plant. When the plants reach the end of the index belts, they are removed by system of two contra rotating belts, covered with material that enables the plants to be pinched without damaging them. The belts are made to contra rotate by a drive unit that incorporates a motor, reversing gearbox, and changeover cylinder. The pneumatic changeover cylinder is used to position the grab position of the delivery belts in front of the respective index belts. Once this pair of delivery belts has collected the plants they are transported towards the ground, where they are ready to be planted in the field. A "V" shaped Coulter is used to cut a slot in the ground, which is then held open by extended fins. The plants are then despatched off the end of the delivery belts into this pre-cut slot. As soon as the plants have been placed in this slot they are immediately pressed into place by two angled press wheels. These wheels also assist in closing the pre-cut slot.

What is claimed is:

1. An automated planter comprising:
 a) at least one extraction device adapted to extract a plant out of a propagation tray;
 b) a delivery assembly arranged to receive extracted plants and to deliver the plants to ground;
 c) a plant transport arranged to receive extracted plants from the at least one extraction device to present said plants to the delivery assembly, the plant transport comprising:
  i) first and a second plant conveyors, each conveyor being adapted to receive extracted plants, and
  ii) a control operable to hold one conveyor in a static state to receive the plants from said at least one plant extraction device while the second conveyor is driven to present previously deposited plants to the delivery assembly.

2. A planter in accordance with claim 1, wherein:
 the planter comprises n plant extraction devices where n is an integer, and
 each conveyor is adapted to receive n extracted plants substantially simultaneously.

3. A planter according to claim 1, wherein the delivery assembly comprises:
 two endless belts arranged adjacent one another so as to be able to grip the extracted plants between opposing surfaces of the belts; and
 a drive assembly arranged to drive the belts at the same speed and such that their opposing surfaces move in the same direction.

4. A planter according to claim 1, wherein the plant transport is adapted to receive an extracted row of plants from the at least one plant extraction device and to present the extracted plants sequentially to the delivery assembly.

5. A planter according to claim 1, wherein:
 the plant transport comprises a plurality of holding ports, the planter further comprising:
  a controller for controlling a position of the holding ports relative to the delivery assembly and
  a sensor,
   with the controller advancing the plant transport in response to the sensor, such that the delivery assembly receives extracted plants at a uniform rate.

6. A planter according to claim 5, wherein the sensor is adapted to sense plant foliage and the controller is adapted to index the plant transport so that the delivery assembly receives properly developed plants at a uniform rate.

7. A planter according to claim 5, wherein:
the sensor is arranged to detect foliage of the plant being conveyed by the plant transport, the sensor being arranged to provide a signal to the controller;
the controller is further arranged to control a drive assembly of the plant transport whereby, if no foliage or inadequately developed foliage is detected, the plant transport is controlled accordingly to ensure that plants are presented to the delivery assembly at substantially regular intervals.

8. A planter according to claim 1, wherein the at least one extraction device comprises an inserting arrangement for inserting at least one insertion member into a root portion of a plant to grip the root portion, the at least one extraction device being adapted to approach a row of plants from a direction transverse to the row and to push foliage of each plant to one side before inserting the insertion member, and the at least one extraction device is adapted to pull the plant out of the propagation tray.

9. A planter according to claim 8, wherein the at least one extraction device is adapted to separate a base of a root portion from a top of the propagation tray by a distance of no more than a height of the root portion, the at least one extraction device moving the extracted plant transversely to an upper surface of the propagation tray.

10. A planter according to claim 8, wherein the at least one extraction device is adapted to pull a row of plants simultaneously from the propagation tray.

11. A planter according to claim 1, wherein the at least one extraction device extracts a row of plants in alignment along a line and translates the plants in a direction perpendicular to that line, the at least one extraction device depositing the line of plants in relation to the plant transport.

12. A planter according to claim 1, wherein the planter further comprises:
holding ports to locate and hold the extracted plants; and
extraction members adapted for insertion into a root portion of the plants, the extraction members being driven generally transversely into the root portion of the plants to hold the plants in said holding ports while the at least one extraction device is withdrawn.

13. A planter according to claim 1, wherein the at least one extraction device comprises:
a) fingers which are sprung such that ends of the fingers are biased towards each other,
b) a spacer member located between the fingers,
c) an arrangement for positioning the spacer member and fingers adjacent to an upper surface of a root portion of a plant, and
d) an arrangement for holding the position of the spacer member constant while driving the fingers down past sides of the spacer member.

14. A planter according to claim 1, wherein the at least one extraction device comprises:
a) fingers which are sprung such that ends of the fingers are biased towards each other, and
b) a spacer member located between the fingers, the spacer member being adapted to engage with an upper surface of a root portion of a plant to allow the fingers to be driven down past the sides of the spacer member, whereby the fingers are inserted into the root portion and converge to grip the root portion.

15. A planter according to claim 14, wherein the planter further comprises a stop for limiting movement of the spacer member so as to at least limit compression of a root portion surface by the spacer member.

16. A planter according to claim 14, wherein the spacer member comprises a cut out to accommodate a plant.

17. A planter according to claim 14, wherein engagement of the spacer member with the upper surface limits downward movement of the spacer, thereby enabling the fingers to be driven down at sides of the spacer member, so that the fingers enter the root portion, converge and grip the root portion.

18. A planter according to claim 14, wherein the spacer member is locatable between a retracted position and an extended position, and in the extended position, the spacer member is configured such that tips of the fingers are prevented from extending beyond a lower edge of the spacer member.

19. A planter according to claim 14, wherein the planter comprises a plurality of plant extraction device, and the planter further comprises a device for actuating respective fingers of the plant extraction devices to converge substantially simultaneously.

20. A planter according to claim 1, wherein the planter comprises a spacer for setting a spacing of the at least one extraction device in accordance with propagation trays.

21. A planter according to claim 1, wherein the planter comprises a plurality of plant extraction devices arranged in a row, whereby a row of plants can be pulled out of a propagation tray simultaneously.

22. A planter according to claim 21, wherein the planter comprises an arrangement for adjusting a separation of the plant extraction devices in a row.

23. A planter according to claim 1, wherein the planter is a field planter.

24. An automatic planter according to claim 1, wherein the planter is a mobile planter.

25. A method of automated planting, comprising the steps of:
a) extracting plants out of a propagation tray by at least one plant extraction device;
b) receiving the extracted plants from the at least one extraction device by a plant transport; and
c) receiving the extracted plants from the plant transport to a delivery assembly and delivering the extracted plants to ground by a delivery assembly,
d) wherein said step of receiving the extracted plants from the at least one extraction device includes the steps of:
i) receiving the extracted plants onto first and second plant conveyors, and
ii) controlling the conveyors to hold one conveyor in a static state to receive the plants from said at least one extraction device while driving the second conveyor to present previously deposited plants to the delivery assembly.

26. A method according to claim 25, wherein said step of receiving the extracted plants from the at least one extraction device includes the steps of:
receiving an extracted row of plants by the plant transport from the at least one plant extraction device, and
sequentially presenting the extracted plants to the delivery assembly.

27. A method according to claim 25,
wherein each conveyor comprises a plurality of holding ports, and
further comprising the step of:

controlling a position of the holding ports relative to the delivery assembly and advancing the conveyors in response to a sensor, such that the delivery assembly receives extracted plants at a uniform rate.

28. A method according to claim 25, wherein said step of extracting includes the steps of:

extracting a row of plants in alignment along a line, and translating the row in a direction perpendicular to that line, the line of plants being deposited in relation to the plant transport.

29. A method according to claim 25, wherein said step of extracting includes the steps of:

providing holding ports to locate and hold the plants; and driving extraction members generally transversely into a root portion of the plants to hold the plants in the holding ports while said at least one extraction device is withdrawn.

30. A method according to claim 25, wherein said step of extracting includes the steps of:

a) arranging spring fingers such that ends of the fingers are biased towards each other, b) arranging a spacer member between the fingers, c) engaging the spacer member with an upper surface of a root portion of a plant to allow the fingers to be driven down past sides of the spacer member.

31. A method according to claim 30, wherein said step of extracting further includes the step of providing a stop for limiting movement of the spacer member so as to at least limit compression of a root portion surface by the spacer member.

32. A method according to claim 30, wherein said step of extracting further includes the steps of:

arranging the spacer member in engagement with the upper surface of a root portion of a plant to limit downward movement of the spacer, and driving down the fingers at sides of the spacer member, so that the fingers enter the root portion, converge and grip a root ball thereof.

33. A method according to claim 30, wherein said step of extracting includes the steps of:

providing a plurality of plant extraction devices, and actuating respective fingers of the at least one plant extraction device to converge substantially simultaneously.

34. A method according to claim 25, wherein said step of extracting includes the step of spacing the at least one extraction device in accordance with the propagation trays.

35. A method according to claim 25, wherein the planter comprises a plurality of plant extraction devices arranged in a row, and said step of extracting includes the step of pulling out a row of plants out of a propagation tray simultaneously.

36. A method according to claim 35, wherein said step of extracting includes the step of adjusting a separation of the plant extraction devices in a row.

37. A method according to claim 25, wherein the method is a method of automatic field planting.

* * * * *